United States Patent
Liu et al.

(10) Patent No.: US 7,995,233 B2
(45) Date of Patent: Aug. 9, 2011

(54) PRINTING CONTROL METHOD CAPABLE OF REDUCING PRINTING MEMORY REQUIREMENT

(75) Inventors: Zhihong Liu, Beijing (CN); Zhaoxiang Lin, Beijing (CN)

(73) Assignees: Peking University Founder Group Co., Ltd., Beijing (CN); Beijing Founder Electronics Co., Ltd., Beijing (CN)

( * ) Notice: Subject to any disclaimer, the term of this patent is extended or adjusted under 35 U.S.C. 154(b) by 784 days.

(21) Appl. No.: 11/813,384

(22) PCT Filed: Dec. 23, 2005

(86) PCT No.: PCT/CN2005/002291
§ 371 (c)(1),
(2), (4) Date: Apr. 16, 2008

(87) PCT Pub. No.: WO2006/072205
PCT Pub. Date: Jul. 13, 2006

(65) Prior Publication Data
US 2009/0080024 A1    Mar. 26, 2009

(30) Foreign Application Priority Data
Jan. 7, 2005    (CN) .......................... 2005 1 0000586

(51) Int. Cl.
*G06K 15/00* (2006.01)
*H04N 1/46* (2006.01)
(52) U.S. Cl. ................ 358/1.16; 358/1.17; 358/504
(58) Field of Classification Search ................. 358/1.16, 358/1.17, 504
See application file for complete search history.

(56) References Cited

U.S. PATENT DOCUMENTS

| | | | |
|---|---|---|---|
| 5,129,049 A | 7/1992 | Cuzzo et al. | |
| 5,870,535 A | 2/1999 | Duffin et al. | |
| 6,359,700 B1 | 3/2002 | Briggs | |
| 6,369,910 B1 * | 4/2002 | Mitani | 358/1.17 |
| 2004/0246502 A1 | 12/2004 | Jacobsen et al. | |

FOREIGN PATENT DOCUMENTS

| | | |
|---|---|---|
| CN | 1199197 A | 11/1998 |
| CN | 1439957 A | 9/2003 |
| EP | 1300754 A2 | 4/2003 |
| JP | 9272231 A | 10/1997 |
| JP | 2001239717 | 2/2003 |

* cited by examiner

*Primary Examiner* — Thomas J Lett
(74) *Attorney, Agent, or Firm* — The Webb Law Firm

(57) ABSTRACT

The present invention belongs to the field of printing control technology, and is especially one kind of printing control method with reducing printing memory requirement. The available printing technology always needs complicated segment forming gratings in advance and occupying great amount of memory. The printing control method of the present invention includes interpreting the page data as banded intermediate format data, calculating the time for forming grating of each band of the intermediate format data, pre-analyzing the bands with time for forming grating greater than the printing time, and arranging the job of forming grating of the complicated bands in the idle print time as far as possible. The said method can reduce the band number of forming gratings in advance and reduce the printing memory requirement.

5 Claims, 8 Drawing Sheets

PRINTING CONTROL METHOD CAPABLE OF REDUCING PRINTING MEMORY REQUIREMENT

FIELD OF THE INVENTION

The present invention belongs to the field of printing control technology, especially relates to a printing control method for reducing printing memory requirement.

BACKGROUND OF THE INVENTION

In the prior art, the workflow of printing a page by using a conventional raster print device comprises three steps: receiving data to be printed from a host; rasterizing the data to a raster bitmap; and transmitting the raster bitmap to a print engine to output.

The raster bitmap must be transmitted to a print engine at a constant speed in some raster print devices like a laser printer because the raster bitmap must be transferred from the print engine at a constant speed to a laser drum. Once the raster bitmap can not be transmitted to the print engine in time, a so-called "print overrun" occurs to block the page from being outputted correctly onto a piece of paper.

Generally, printing control methods used for the raster print devices in which the raster bitmap are transmitted to the print engine at a constant speed are as follows.

(1) A page is pre-rasterized into the raster bitmap and the raster bitmap are stored in a memory for printing. In this method, the print overrun does not surely occur because the raster bitmap are stored in the memory. However, the shortcoming of this method is that raster print devices with high resolution generally need a large memory. So do Color printers. For example, to store a CMYK color page of A4 with 600 DPI, a memory about 16 MB is needed. This may increase the cost greatly. Furthermore, according to this method, the printing can be started only after the rasterization of a whole page is finished, resulting in reduction of printing speed.

(2) Another known method is dividing a page into multiple bands. According to the method, data of a page are interpreted as an intermediate format arranged in bands, which are easily transformed to the final raster bitmap and occupy much less memory than the raster bitmap of the same page do. The printing can be started after one band is rasterized. As the rasterized band is printed, the raster bitmap of the next band are generated. This method can increase the printing speed and reduce the memory requirement for storing the raster bitmap of a whole page. However, it is a shortcoming of this method that, if the data of a certain band is too complicated to be fully rasterized before the printing of the preceding band is completed, "print overrun" will occur and the page cannot be correctly outputted.

In order to prevent the print overrun, a known solution is pre-counting the rasterizing time required by each of bands. If one or more bands need more time for rasterization separately than the printing time of the preceding band, the bands will be pre-rasterized before printing the page. This solution eliminates the print overrun, but its disadvantage is that the memory is occupied by the raster bitmap of those pre-rasterized bands, resulting in increasing the memory requirement and the cost of the controller.

To address the issue, a lot of improvements are proposed. For example, U.S. Pat. No. 5,129,049 owned by H.P. Company provides a method, in which, if the content of a certain band is very simple or the band have been pre-rasterized, printing the band needs less time than the time for rasterizing one band and an idle time occurs. The idle time could be used for rasterizing the next band. In this way, if the next band needs more time for rasterization, the next band will not need pre-rasterization. Therefore, number of pre-rasterized bands can be reduced to a certain extent. However, this known method uses the idle time of the immediate preceding band only, without utilizing the idle time of all simple bands and idle time of all pre-rasterized bands. Thus, the method fails to minimize number of the bands needing to be pre-rasterized and the printing memory requirement cannot be reduced significantly.

SUMMARY OF THE INVENTION

To overcome the shortcomings of the prior art, the present invention is to provide a printing control method capable of reduction of the printing memory requirement. According to the method, the idle time of rasterization of all simple bands and all pre-rasterized bands is fully used for mastering those complicated bands in the process of printing so as to minimize the bands requiring to be pre-rasterized before printing. Thus, the memory requirement of a complicated page is reduced accordingly.

In order to accomplish the above object, the technical solution used in the present invention is a printing control method for reducing printing memory requirement, comprising the following steps:

(A) receiving print data from a host through an interface;

(B) determining the number of bands of each page to be divided, and the printing time length (TP) of each band, in light of the page, size, the printing speed, and so on;

(C) interpreting the print data to be intermediate format data corresponding to each band;

(D) computing the rasterizing time length (TR) for rasterizing each band in the form of the intermediate format data;

(E) defining each band whose printing time length (TP) is less than its rasterizing time length (TR) as a complicated band;

(F) defining each band whose printing time length (TP) is larger than or equal to its rasterizing time length (TR) as a simple band;

(G) determining start timing of rasterization of each band, further comprising:

(1) initializing the start timing of printing of each band as the result arising from multiplying TP and the value of said respective band number minus 1, wherein the TP refers to the necessary printing time length of one band;

(2) setting end timing of rasterization of each band as the start timing of printing the same band, wherein the start timing of rasterization of each simple band is set as a result of the end timing of rasterization of the same band minus the rasterizing time length TR for rasterizing the same band;

(3) initializing printing idle time length of each band as the printing time length (TP) of respective band;

(4) subtracting time length occupied by rasterization of each simple band except for the first band from the printing idle time length, wherein a concrete method is that the rasterizing time length of a certain band is subtracted from the printing idle time length of a previous band;

(5) turning to the step (10) if unmarked complicated bands do not exist;

(6) computing the start timing of rasterization of each unmarked complicated band;

(7) selecting the band which has the maximal start timing of rasterization and is an unmarked band as an operating band, wherein if the start timing of rasterization of the operating band is less than 0 the step (G) is ended;

(8) updating the end timing of rasterization of the operating band as the band number of the last band prior to the operating band, whose printing idle time length is not equal to 0 and marking the operating band;

(9) removing the time length occupied by rasterization of the operating band from a printing idle time length information and turning to the step (5);

(10) updating the start timing of rasterization of each complicated band;

(H) starting a printing task and starting to print the page until the end of the printing.

Further, a method of updating the start timing of rasterization of each complicated band in the step (10) of the step (G) comprises the steps of:

(1) setting the start timing of rasterization of all the unmarked complicated bands as −1 and marking all the unmarked complicated bands as bands to be pretreated;

(2) initializing the printing idle time length of each band as the printing time of respective band;

(3) subtracting the time length occupied by rasterization of each simple band except for the first band from the printing idle time length, wherein a concrete method is that the rasterizing time length of a certain band is subtracted from the printing idle time length of the previous band;

(4) ending the step (10) if marked complicated bands do not exist, otherwise, selecting the band which has the maximal value of end timing of rasterization from those marked complicated bands as the operating band;

(5) computing the start timing of rasterization of the operating band; and (6) removing the time length occupied by rasterization of the operating band from the printing idle time length and a mark of the operating band and turning to the step (4).

Further, computing the start timing of rasterization of one band in the step (6) of the step (G) and the step (5) of the step (10) of the step (G) comprises the following steps, the band to be initialized is named the operating band herein:

(a) setting a required time length as the time length for rasterizing the operating band and setting a current band as the operating band;

(b) judging whether the band number of the current band is less than 2, wherein if yes, the operating band must be pretreated, the start timing of rasterization of the operating band is set as −1 and the step (6) of claim 1 or the step (5) of claim 3 is ended, if not, a next step is carried out;

(c) subtracting the printing idle time length of the band which immediately precedes to the current band from the required time length;

(d) setting the band which immediately precedes the current band as a new current band and turning to the step (b) if the required time length is larger than 0, and carrying out the next step if the required time length is not larger than 0; and (e) setting the start timing of printing an above preceding band plus the absolute value of the required time length as the start timing of rasterization of the operating band.

Further, removing the time length occupied by rasterization of the operating band in the step (9) of the step (G) and the step (6) of the step (10) of the step (G) comprises the following steps:

(a) setting a required time length as the time length for rasterizing the operating band and setting a current band as the operating band;

(b) subtracting the printing idle time length of the band which immediately precedes the current band from the required time length;

(c) setting the printing idle time length of the band which immediately precedes the current band as 0 and the band which immediately precedes the current band as a new current band and turning to the step (b) if the required time length is larger than 0, and carrying out the next step if the required time length is not larger than 0; and (d) setting the idle time length of the band which immediately precedes the current band as the absolute value of the required time length.

Further, the printing task in the step (H) is used mainly for operating printing work, the printing task comprises the steps of:

(1) pre-rasterizing all the bands whose start timing of rasterization is −1;

(2) setting up an auxiliary task if there is any complicated band whose start timing of rasterization is larger than or equal to 0, wherein the auxiliary task has a lower priority than the main printing task, each complicated band is started to be rasterized in the auxiliary task at the start timing of rasterization of the relevant complicated band;

(3) rasterizing Band 1 and transmitting the bitmap to a print buffer;

(4) starting a print engine to print the band which is currently in the print buffer;

(5) rasterizing a next band in the main printing task till the start timing of its rasterization if the next band to be printed is the simple band;

(6) obtaining the raster bitmap of the next band and transmitting the raster bitmap to the print buffer;

(7) starting to print the next band by the print engine; and (8) repeating the steps (5, 6 and 7) until the page is completely printed.

The present invention has the following effects. According to the printing control method of the present invention, making full use of the idle time length of rasterization of all the simple bands and pre-rasterized bands, complicated bands can be rasterized in the printing process to minimize the bands which is to be pre-rasterized before the beginning of printing so that the printing memory requirement is reduced.

DESCRIPTION OF THE PREFERRED EMBODIMENTS

Hereinafter, a detailed description of the present invention will be given with reference to the appended drawings.

Figure 1:
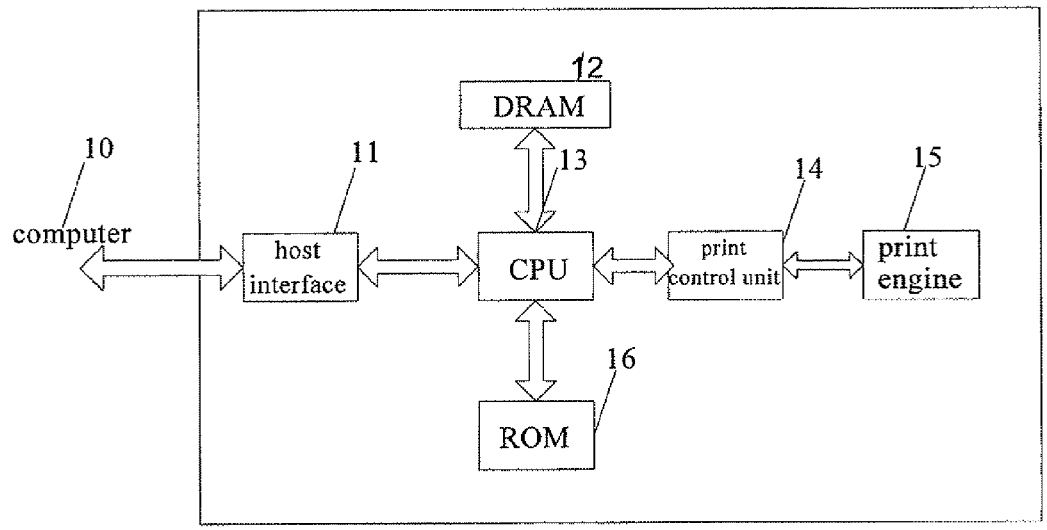
FIG. 1 is a schematic diagram of a printing control method.

FIG. 1 shows the printing control method according to the present invention as well a laser printer comprising a host interface 11, a CPU 13, a ROM 16, a DRAM 12, a print control unit 14, a print engine 15, etc. The host interface 11 is configured to be a parallel interface, a network, a USB or the like. The printer receives the data to be printed from a computer 10 through the host interface 11. The CPU 13 is a central control unit of the printer. The ROM 16 is used for storing programs, fonts, etc. The DRAM 12 provides a space for running the programs and functions as a buffer for buffering a raster bitmap. The print control unit 14 controls the print engine 15 to print the raster bitmap on paper.

Figure 2:
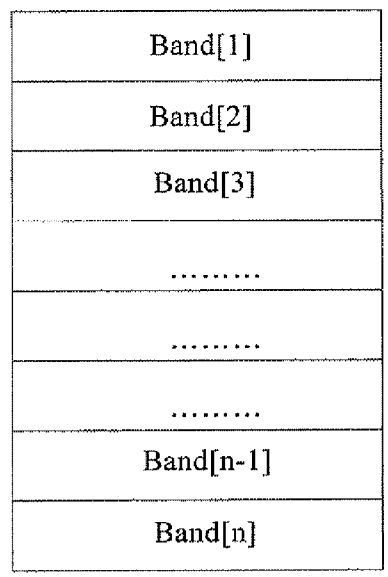
FIG. 2 is a schematic diagram showing a page to be printed and how to divide the page into N bands.

As shown in FIG. 2, a page to be printed can be logically divided into multiple bands, like N bands (N≧2), along the movement direction of a piece of paper. Each band comprises identical number of scanning lines, such as M lines. If the total number of scanning lines of one page is not equal to N*M, the number of the lines of the last band will be less than M, which does not influence the availability of the present invention. Assuming that the time length for printing the whole page is T seconds, the time length for printing one band will be TP=T/N. TP is also the time length for generating the raster bitmap of the next band. If the raster bitmap of the next band cannot be fully generated within TP, said "Print Overrun" will occur.

Figure 3:
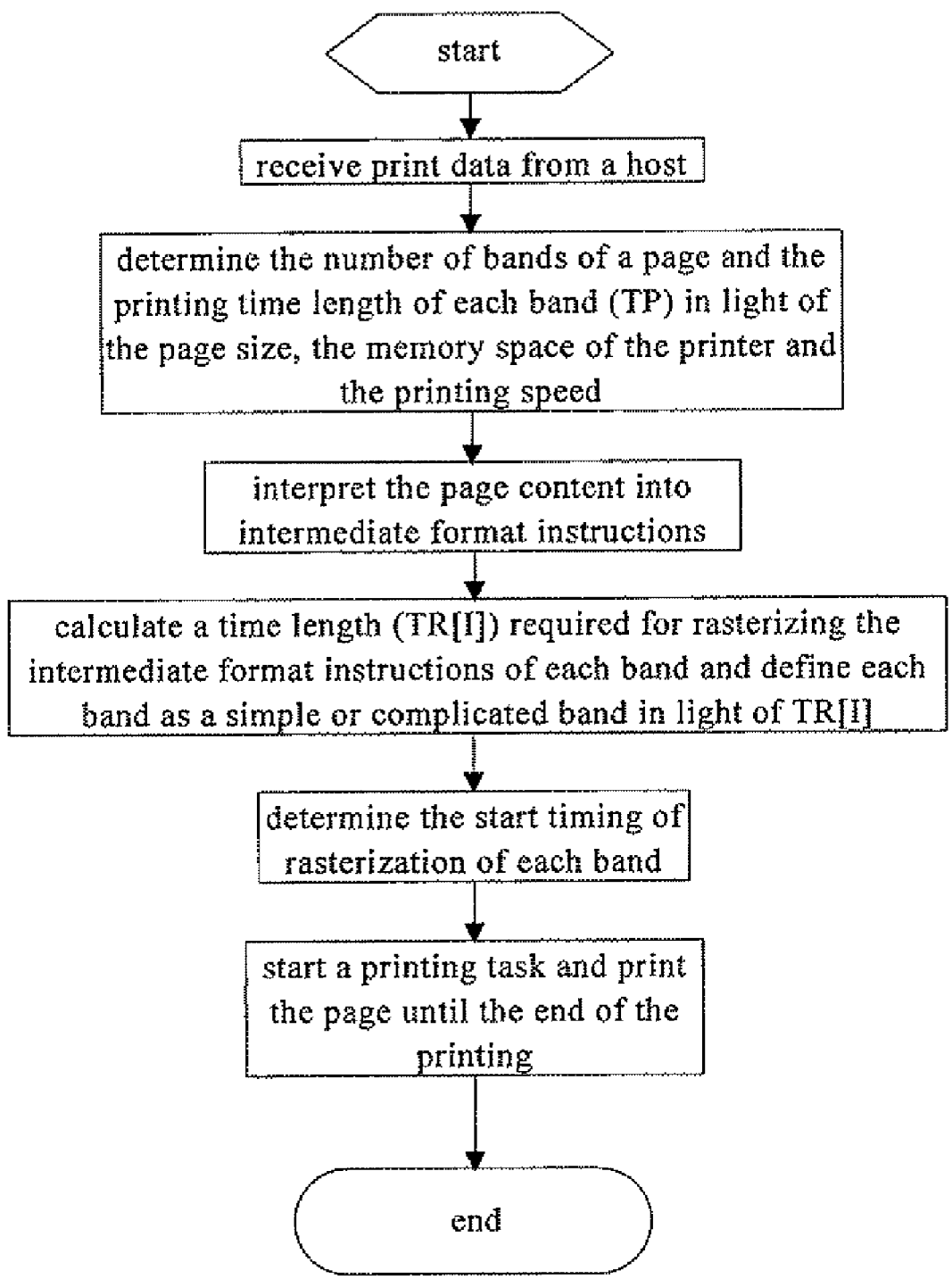
FIG. 3 is a flowchart of printing steps.

As shown in FIG. 3, the present invention provides a printing control method capable of reducing printing memory requirement.

Specifically, the printer receives page content described with a page description language such as PostScript or PCL from the computer 10 through the host interface 11. The received information is stored in the DRAM 12. The programs stored in the ROM 16 determine, in light of the movement direction of the paper, page size, the printing speed, the memory space of the printer, the performance of the CPU, and so on, how many bands to be divided for the page. For example, N bands are divided for the page. Along the of movement direction of the paper, the divided bands is in turn named as Band 1, Band 2, Band 3, . . . , Band N. Moreover, according to the time length T for printing one page, the time length for printing one band is TP=T/N. Subsequently, the contents (e.g. text, graphics, etc) of the page content are interpreted into a series of simple intermediate format instructions from which the raster bitmap can be easily obtained. These instructions are already stored in respective bands according to respective positions of the band on the page. Usually, the space occupied by the intermediate format instructions of a whole page is much less than that occupied by the raster bitmap.

Next step is to calculate a time length required for rasterizing the intermediate format instructions of each band into the raster bitmap according to the content of the intermediate format instructions of the band. The time length is, e.g. denoted as TR[I] for Band I.

TR(I) is compared with TP. If TP<TR[I], Band I is defined as a complicated band. Otherwise, Band I is defined as a simple band and marked.

Next step is to determine the start timing of rasterization of each band, which will be explained in detail with reference to FIG. 4.

Finally, a printing task is started and the page is printed, which will be explained with reference to FIG. 6.

Figure 4:
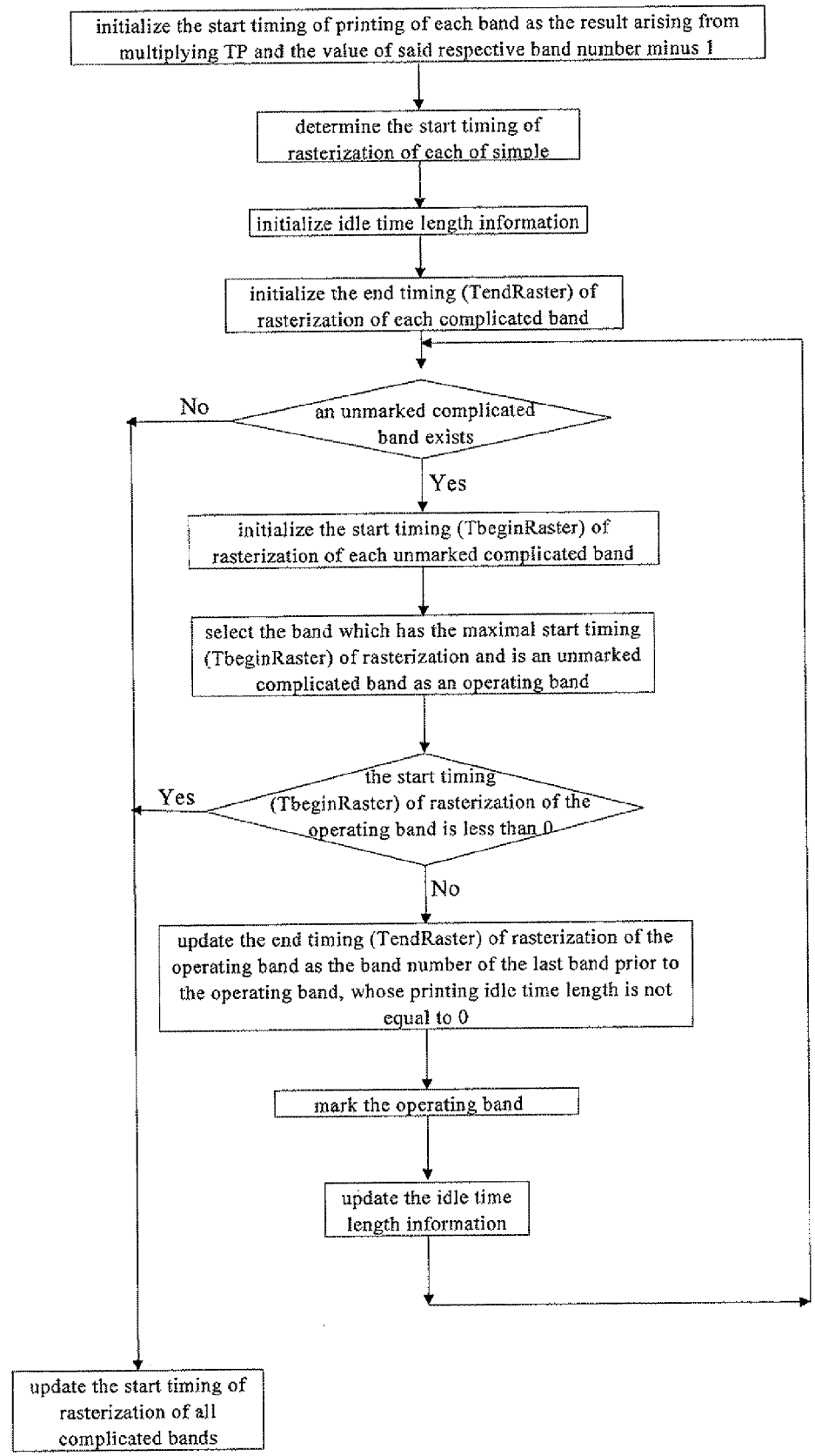
FIG. 4 is a flowchart showing how to determine the rasterizing time according to the present invention.

As shown in FIG. 4, determining the start timing of rasterization of each band comprises the following steps:

(1) initializing the start timing of printing each band, wherein the start timing of printing the first band is marked with 0, and the start timing of any of the rest band is marked with the result arising from multiplying TP and the value of said relevant band number minus 1;

(2) determining the start timing of rasterization of each of simple bands, wherein the end timing (TendRaster) of rasterization of each simple band is set as the start timing of printing the same band. Thus, the end timing (TendRaster) of rasterization of one simple band minus the time length (TR) of rasterizing this band will be the start timing (TbeginRaster) of rasterization of the band;

(3) initializing idle time length information, wherein the idle time length of each band is initialized as the printing time (TP) of respective band, and then the time lengths occupied by rasterization of each of simple bands except for the first band is subtracted from the total idle time lengths. For instance, the time length of rasterizing a certain band is subtracted from the idle time length of the immediate preceding band;

(4) initializing the end timing of rasterization of each complicated band, wherein the end timing of rasterization of a complicated band is initialized as the start timing of printing the same band;

(5) checking whether any complicated band has not been marked. If not, the procedure turns to update the start timing of rasterization of all bands;

(6) initializing the start timing of rasterization of each unmarked complicated band if any, wherein the start timing (TbeginRaster) of rasterization of a band refers to, if all the idle time lengths can be utilized for one band, the timing which is set for ensuring the completion of rasterization of the same band prior to the end timing (TendRaster) of rasterization of the same band, i.e. the latest start timing of rasterization of the band, which will be explained in detail with reference to FIG. 5;

(7) selecting a band which has the maximal value of start timing of rasterization from those unmarked bands as an operating band;

(8) turning to update the start timing of rasterization of all bands if the start timing of rasterization of the operating band is less than 0;

(9) otherwise, updating the end timing (TendRaster) of rasterization of the operating band with a band number. The band precedes the operating band but the idle time length of the band is not 0;

(10) marking the operating band; and

Figure 6:
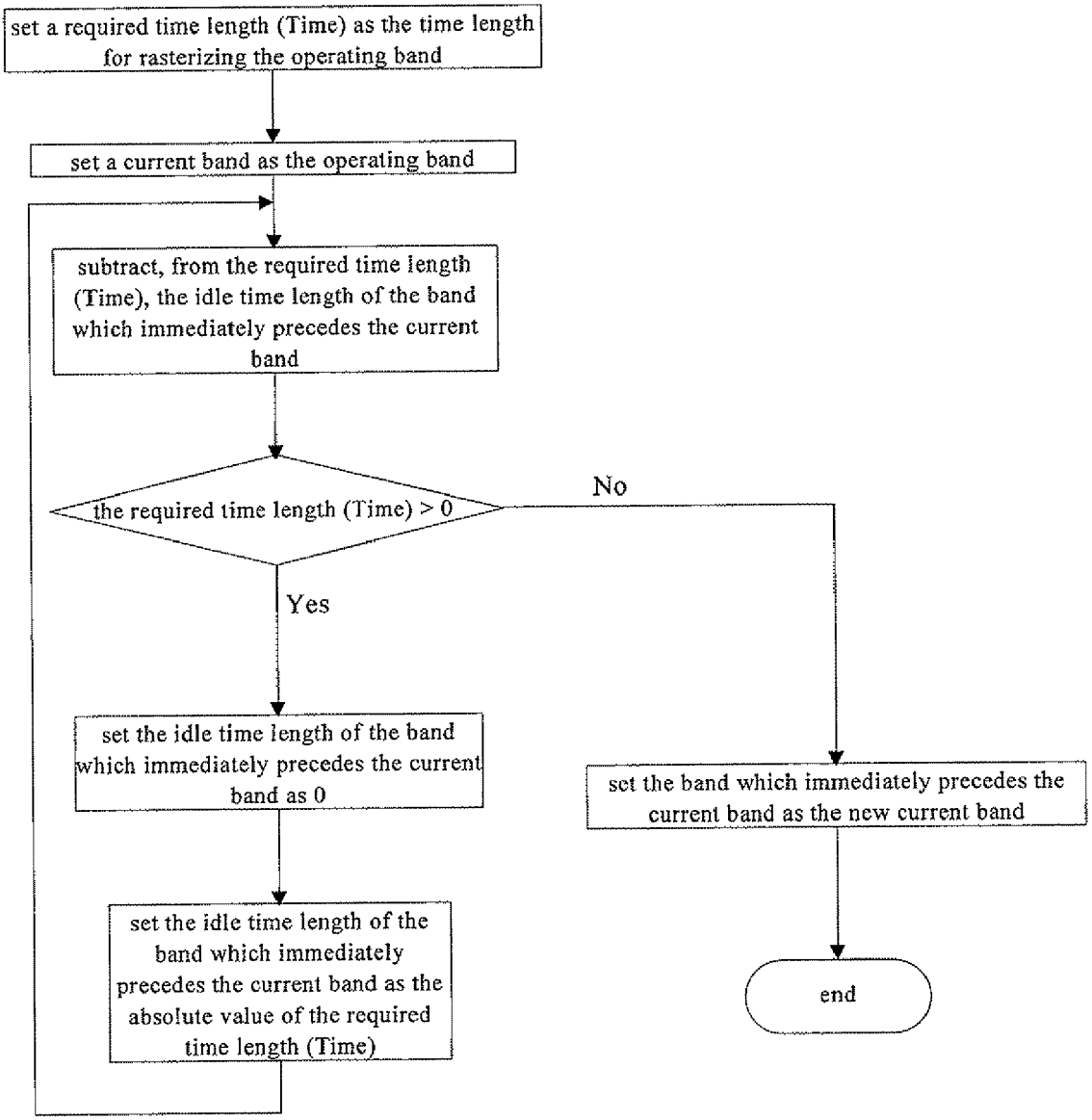
FIG. 6 is a flowchart showing that the time spent by rasterizing a current band is removed from an idle time length.

(11) updating the idle time length information, wherein the time length occupied by the operating band is removed from the idle time length, as shown in FIG. 6; and then turning to the step (5) to check whether any band to be operated exists.

It is determined which bands may be arranged in an auxiliary task. All determined bands to be arranged in the auxiliary task are marked and then the start timing of rasterization of all bands should be updated. Such process is shown in detail in FIG. 7.

Figure 5:
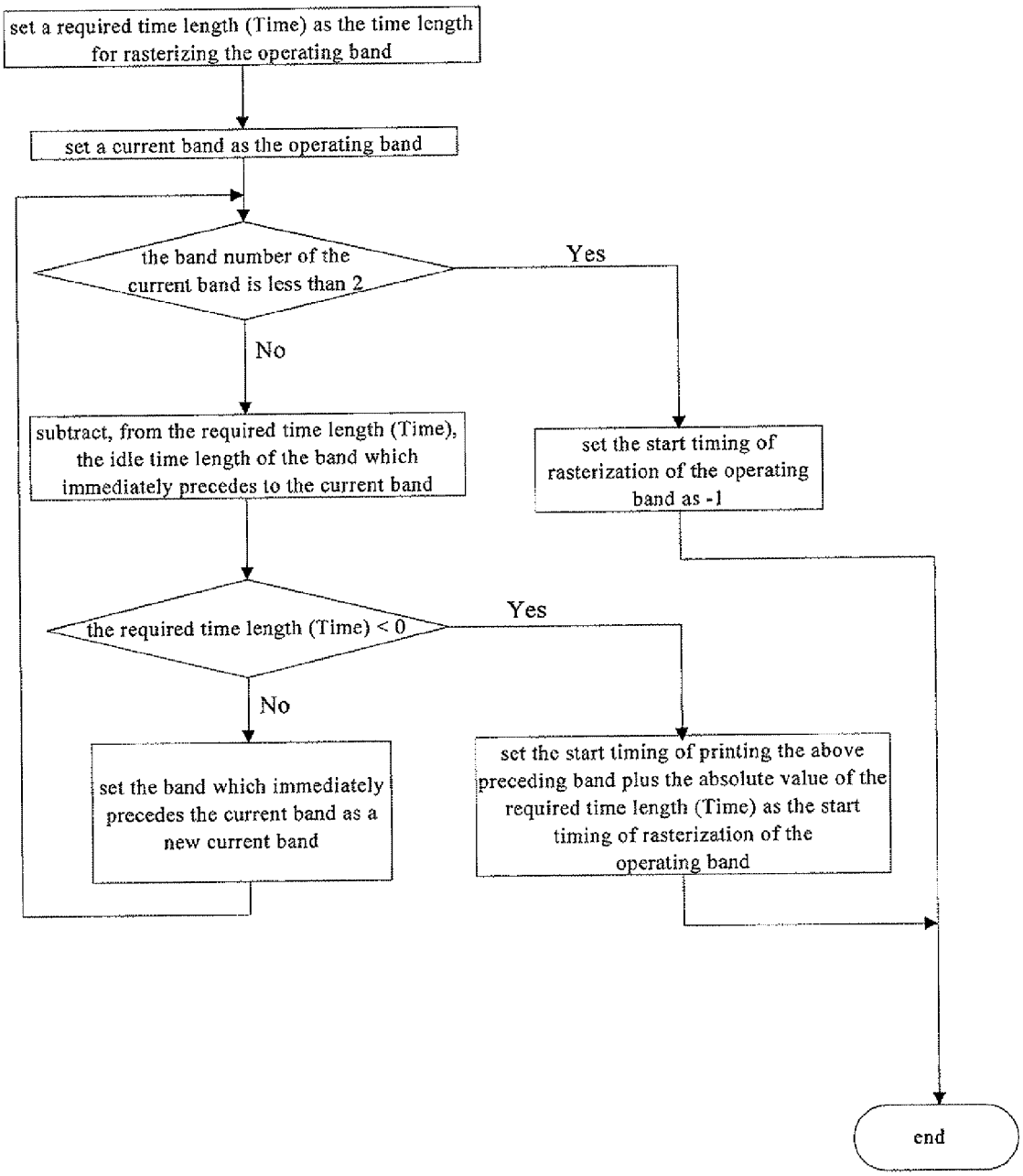
FIG. 5 is a flowchart showing the determination of the start timing of rasterization for a band.

FIG. 5 shows how to determine the start timing of rasterization of the operating band. The detailed steps are as follows:

(1) setting a required time length (Time) as the time length for rasterizing the operating band;

(2) setting a current band as the operating band, and judging whether the band number of the current band is less than 2. If yes, the start timing of rasterization of the operating band is set as −1 and the procedure is ended. If not, the next step is carried out;

(3) subtracting, from the required time length (Time), the idle time length of the band which immediately precedes to the current band; and (4) judging whether the required time length (Time)<0. If yes, the start timing of printing the above preceding band plus the absolute value of the required time length (Time) is set as the start timing of rasterization of the operating band. If not, the band which immediately precedes the current band is set as a new current band. Then, it is judged whether the new current band number is less than 2 or not. If yes, the start timing of rasterization of the operating band is set as −1 and the procedure is ended. If not, step (3) is repeated.

As shown in FIG. 6, the operation for removal of the time length for rasterizing the operating band comprises the following steps:

(1) setting a required time length (Time) as the time length for rasterizing the operating band;

(2) setting a current band as the operating band, and subtracting, from the required time length (Time), the idle time length of the band which immediately precedes the current band; and (3) judging whether the required time length (Time)>0. If the required time length (Time) is less than 0, the idle time length of the band which immediately precedes the current band is set as the absolute value of the required time length (Time) and the procedure is ended. If not, the idle time length of the band which immediately precedes the current band is set as 0, the band which immediately precedes the current band is set as the new current band, and the idle time length of the band which immediately precedes the current band is subtracted from the required time length (Time).

Figure 7:
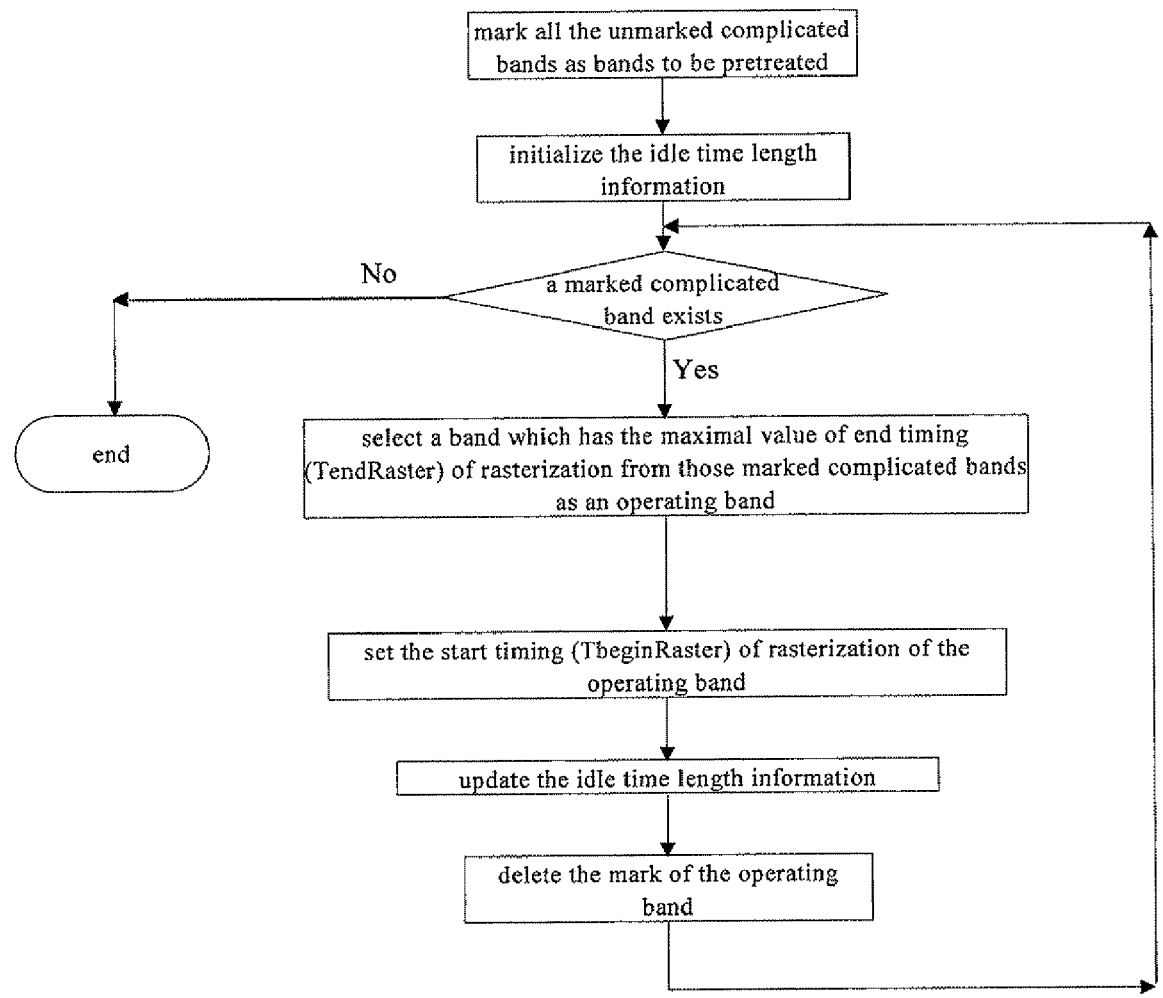
FIG. 7 is a flowchart showing how to update a start timing of rasterization of each band.

As shown in FIG. 7, the start timing of rasterization of each complicated band is updated. The unmarked complicated bands are set as bands to be pretreated. The order of rasterization of those marked complicated bands is arranged according to the determined order of end timing of rasterization in FIG. 4. Each complicated band in the arrangement is rasterized as late as possible, as long as the latter bands have sufficient time to be rasterized. FIG. 7 proposes specific steps:

(1) marking all the unmarked complicated bands as bands to be pretreated and setting their start timing of rasterization as −1;

(2) initializing the idle time length information. In particular, the idle time length of each band is initialized as the printing time (TP) of respective band, and the time length occupied by rasterization of each simple band except for the first band is subtracted from the idle time length. The subtraction is carried out by subtracting the rasterizing time of a certain band from the idle time length of the band which immediately precedes said certain band;

(3) ending this process if there is no marked complicated band, otherwise, going ahead to the next step;

(4) selecting a band which has the maximal value of end timing (TendRaster) of rasterization from those marked complicated bands as an operating band;

(5) computing the start timing of rasterization of the operating band according to FIG. 5;

(6) updating the idle time length information and removing the time length occupied by rasterization of the operating band according to FIG. 6; and (7) deleting the mark of the operating band and checking whether any marked complicated band still exists.

Figure 8:
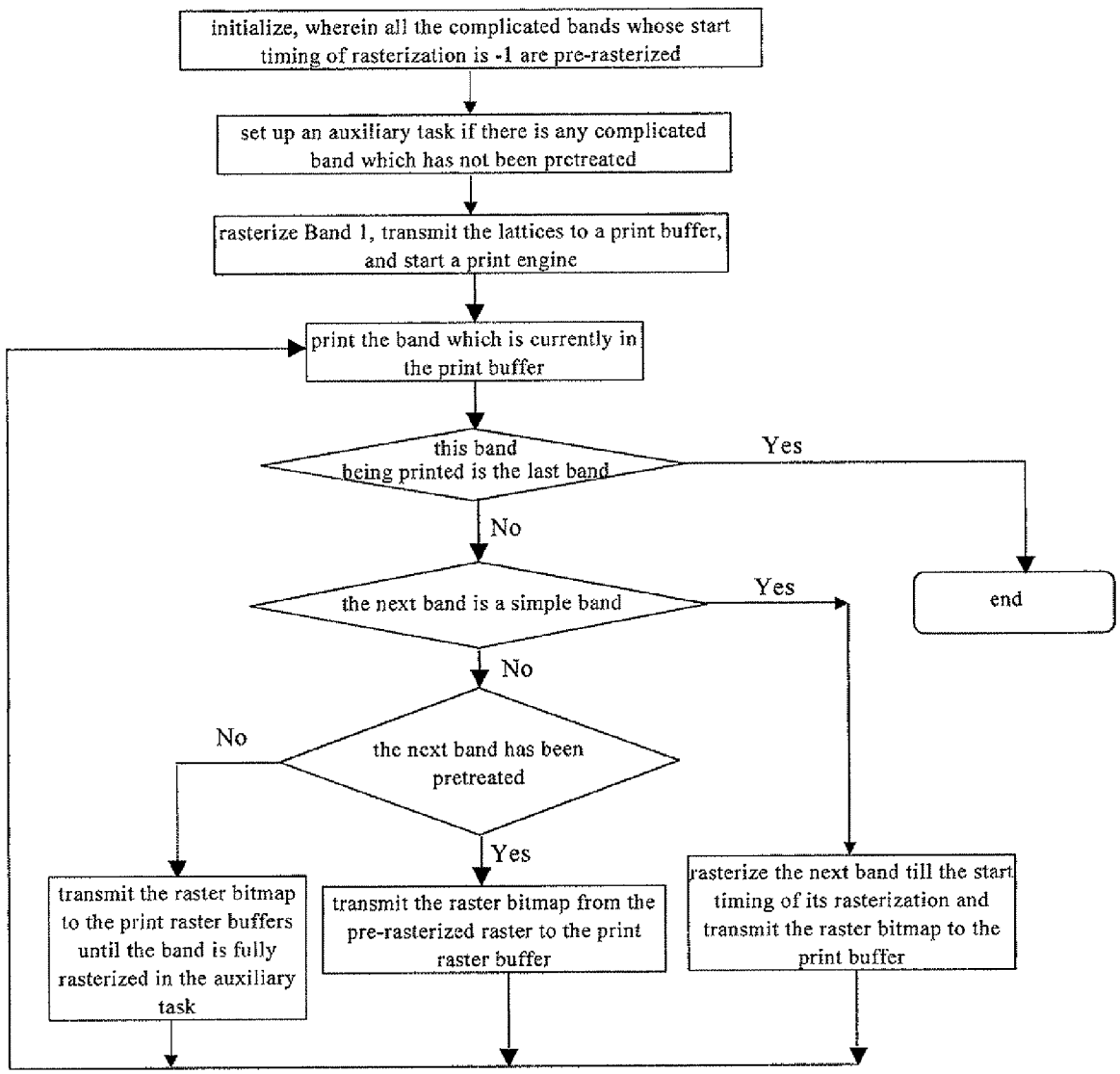
FIG. 8 is a flowchart of the main printing task.

As shown in FIG. 8, the detailed steps of the printing task are as follows:

(1) initializing, wherein all the bands which are marked as bands to be pretreated are pre-rasterized;

(2) setting up an auxiliary task if there is any complicated band which has not been pretreated, wherein the complicated band which has not been pretreated is rasterized in the auxiliary task. The main printing task has a higher priority than the auxiliary task, so the auxiliary task can be only run when the main printing task is idle;

(3) rasterizing Band 1 and transmitting the bitmap to a print buffer, and starting a print engine;

(4) printing the band which is currently in the print buffer; and (5) judging whether this band being printed is the last band, and ending printing if yes; otherwise, judging whether the next band is a simple band, the next band is rasterized till the start timing of its rasterization if the next band is a simple band, and the raster bitmap are transmitted to the print buffer; if the next band is not a simple band, it is further judged whether the next band is a pretreated complicated band. If it is true, the raster bitmap from the pre-rasterized raster are transmitted to the print raster buffer, otherwise, the raster bitmap are transmitted to the print raster buffers until the band is fully rasterized in the auxiliary task.

Figure 9:
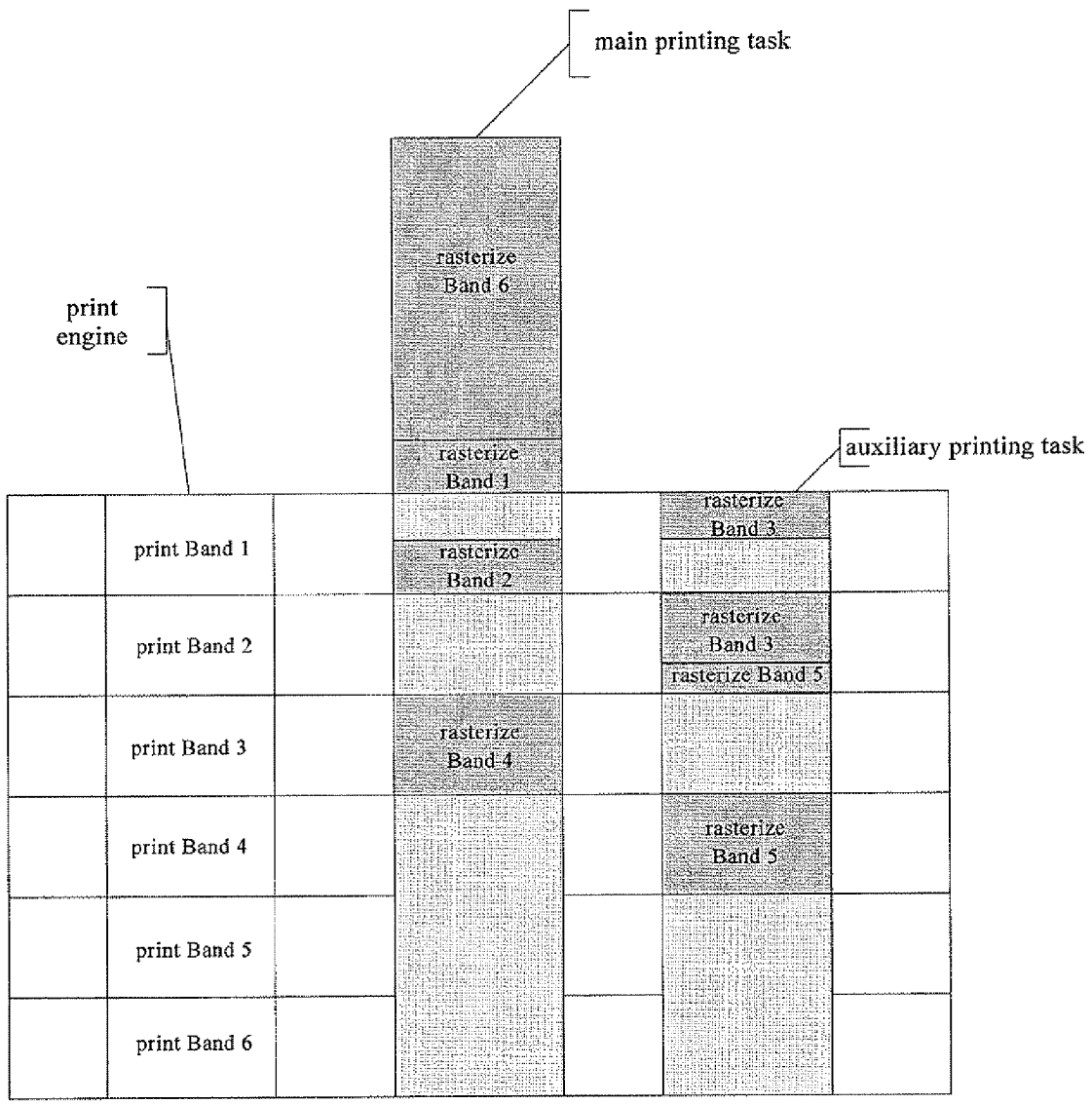
FIG. 9 schematically shows running a main printing task in parallel with running an auxiliary printing task in the printing process.

FIG. 9 is a simplified example according to the embodiment of the present invention for showing the parallel run of the main printing task, the auxiliary printing task and the print engine in the printing output process.

As shown in FIG. 9, a page is divided into, e.g. six bands, wherein the first, second and fourth bands are simple bands whose rasterizing time lengths are respectively 0.5 TP, 0.5 TP and 1 TP (TP is the time length for printing one band), and the third, fifth and sixth bands are complicated bands whose rasterizing time lengths are respectively 1.25 TP, 1.25 TP and 3.25 TP. According to the present invention, the sixth band is marked as a pretreated band, the fifth band is started to be rasterized after 1.75 TP in the auxiliary task after the beginning of printing, and the third band is started to be rasterized in the auxiliary task upon starting the printing.

While starting the printing, the main printing task enables an auxiliary printing task to rasterize the third and fifth bands. The auxiliary printing task has a lower priority than the main printing task. The main printing task rasterizes all the non-real-time rasterized bands (i.e. the sixth band) prior to rasterizing the first band.

While the print engine is started to print the first band, the auxiliary printing task is started to rasterize the third band. The auxiliary printing task is suspended after 0.5 TP. At this time, the main printing task is started to rasterize the second band 0.5 TP.

While printing the first band is finished, the rasterization of the second band by the main printing task is also finished. The print engine is started to print the second band and the auxiliary printing task is continued to rasterize the third band. Rasterizing the third band is finished after 1.75 TP. At this time, the auxiliary printing task is started to rasterize the fifth band.

While printing the second band is finished, the main printing task starts the print engine to print the third band. Meanwhile, rasterizing the fourth band is started.

While printing the third band is finished, the main printing task starts the print engine to print the fourth band. Since the fifth band is a complicated band, its rasterization is not implemented in the main printing task. Therefore, the main printing task becomes idle.

While printing the fourth band is finished, the main printing task starts the print engine to print the fifth band. Since the next sixth band is a complicated band, it is not rasterized in the main printing task. Therefore, the main printing task maintains idle.

While printing the fifth band is finished, the main printing task starts the print engine to print the sixth band.

While printing the sixth band is finished, the printing for the page is ended.

As the example shown in FIG. 6, the printing can be started only after the pre-rasterization of the first, third, fifth and sixth bands in the prior print art. According to the present invention, the printing can be started only after rasterizing the first and sixth bands. The rasterization of the third and fifth bands can be proceeded in the printing process. Therefore, it can reduce the printing memory requirement.

The above description is one embodiment of the present invention and not restrictive to the present invention. For example, although the above is described with reference to laser printers, the invention is adaptive to ink-jet printers with raster bitmaps, phototypesetters with raster bitmaps, and the like. Thus, without departing from the spirit and principle of the present invention, any modifications, substitutions and improvements should be within the scope of the present invention.

The invention claimed is:

1. A printing control method for reducing printing memory requirement, comprising:
   (A) receiving print data of a page from a host through an interface;
   (B) determining a number of bands of the page to be divided, and a printing time length of each band;
   (C) interpreting the print data to intermediate format data corresponding to each band;
   (D) computing a rasterizing time length for rasterizing each band in the form of the intermediate format data;
   (E) defining each band whose printing time length is less than its rasterizing time length as a complicated band;
   (F) defining each band whose printing time length is larger than or equal to its rasterizing time length as a simple band;
   (G) determining start timing of rasterization of each band and setting the start timing of printing a first band as 0, further comprising:
      (1) initializing the start timing of printing of each band as the result arising from multiplying TP and the value of said respective band number minus 1, wherein the TP refers to the necessary printing time length of one band;
      (2) setting end timing of rasterization of each band as the start timing of printing the same band, wherein the start timing of rasterization of each simple band is set as a result of the end timing of rasterization of the same band minus the rasterizing time length TR for rasterizing the same band;
      (3) initializing printing idle time length of each band as the printing time length of respective band;
      (4) subtracting time length occupied by rasterization of each simple band except for the first band from the printing idle time length, wherein a concrete method is that the rasterizing time length of a certain band is subtracted from the printing idle time length of a previous band;
      (5) turning to the step (10) if unmarked complicated bands do not exist;
      (6) computing the start timing of rasterization of each unmarked complicated band;
      (7) selecting the band which has the maximal start timing of rasterization and is an unmarked band as an operating band, wherein if the start timing of rasterization of the operating band is less than 0 the step (G) is ended;
      (8) updating the end timing of rasterization of the operating band as the band number of the last band prior to the operating band, whose printing idle time length is not equal to 0 and marking the operating band;
      (9) removing the time length occupied by rasterization of the operating band from a printing idle time length information and turning to the step (5);
      (10) updating the start timing of rasterization of each complicated band; and
   (H) starting a printing task to print the page until the end of the printing.

2. The printing control method for reducing printing memory requirement as defined in claim 1, wherein the printing task in the step (H) is used mainly for operating printing work, the printing task comprises the steps of:
   (1) pre-rasterizing all the bands whose start timing of rasterization is −1;
   (2) setting up an auxiliary task if there is any complicated band whose start timing of rasterization is larger than or equal to 0, wherein the auxiliary task has a lower priority than the main printing task, each complicated band is started to be rasterized in the auxiliary task at the start timing of rasterization of the relevant complicated band;
   (3) rasterizing Band 1 and transmitting a bitmap to a print buffer;
   (4) starting a print engine to print the band which is currently in the print buffer;
   (5) rasterizing a next band in the main printing task till the start timing of its rasterization if the next band to be printed is the simple band;
   (6) waiting for the end of printing the current band, obtaining a raster bitmap of the next band and transmitting the raster bitmap to the print buffer;
   (7) starting to print the next band by the print engine; and
   (8) repeating the steps (5, 6 and 7) until the page is completely printed.

3. The printing control method for reducing printing memory requirement as defined in claim 1, wherein a method of updating the start timing of rasterization of each complicated band in the step (10) comprises the steps of:
   (1) setting the start timing of rasterization of all the unmarked complicated bands as −1 and marking all the unmarked complicated bands as bands to be pretreated;
   (2) initializing the printing idle time length of each band as the printing time of respective band;
   (3) subtracting the time length occupied by rasterization of each simple band except for the first band from the printing idle time length, wherein a concrete method is that the rasterizing time length of a certain band is subtracted from the printing idle time length of the previous band;
   (4) ending the step (10) if marked complicated bands do not exist, otherwise, selecting the band which has the maximal value of end timing of rasterization from those marked complicated bands as the operating band;
   (5) computing the start timing of rasterization of the operating band; and
   (6) removing the time length occupied by rasterization of the operating band from the printing idle time length and a mark of the operating band and turning to the step (4).

4. The printing control method for reducing printing memory requirement as defined in claim 1 or 3, wherein computing the start timing of rasterization of one band in the step (6) of claim 1 and the step (5) of claim 3 comprises the following steps, the band to be initialized is named the operating band herein:
   (a) setting a required time length as the time length for rasterizing the operating band and setting a current band as the operating band;
   (b) judging whether the band number of the current band is less than 2, wherein if yes, the operating band must be pretreated, the start timing of rasterization of the operating band is set as −1 and the step (6) of claim 1 or the step (5) of claim 3 is ended, if not, a next step is carried out;

(c) subtracting the printing idle time length of the band which immediately precedes to the current band from the required time length;

(d) setting the band which immediately precedes the current band as a new current band and turning to the step (b) if the required time length is larger than 0, and carrying out the next step if the required time length is not larger than 0; and (e) setting the start timing of printing an above preceding band plus the absolute value of the required time length as the start timing of rasterization of the operating band.

5. The printing control method for reducing printing memory requirement as defined in claim 1 or 3, wherein removing the time length occupied by rasterization of the operating band in the step (9) of claim 1 and the step (6) of claim 3 comprises the following steps:

(a) setting a required time length as the time length for rasterizing the operating band and setting a current band as the operating band;

(b) subtracting the printing idle time length of the band which immediately precedes the current band from the required time length;

(c) setting the printing idle time length of the band which immediately precedes the current band as 0 and the band which immediately precedes the current band as a new current band and turning to the step (b) if the required time length is larger than 0, and carrying out the next step if the required time length is not larger than 0; and (d) setting the idle time length of the band which immediately precedes the current band as the absolute value of the required time length.

* * * * *

UNITED STATES PATENT AND TRADEMARK OFFICE
CERTIFICATE OF CORRECTION

PATENT NO. : 7,995,233 B2
APPLICATION NO. : 11/813384
DATED : August 9, 2011
INVENTOR(S) : Zhihong Liu It is certified that error appears in the above-identified patent and that said Letters Patent is hereby corrected as shown below:

Title Page, item (73) Assignees, add the following:
-- Peking University, Beijing (CN) --

Signed and Sealed this
Twenty-seventh Day of December, 2011

David J. Kappos
*Director of the United States Patent and Trademark Office*